US005337778A

United States Patent [19]

Thomsen et al.

[11] Patent Number: 5,337,778

[45] Date of Patent: Aug. 16, 1994

[54] PRESSURE CONTROL VALVE

[75] Inventors: Svend E. Thomsen, Nordborg; Thorkild Christensen, Sonderborg, both of Denmark; Siegfried Zenker, Kirchseeon, Fed. Rep. of Germany

[73] Assignee: Danfoss A/S, Nordborg, Denmark

[21] Appl. No.: 40,141

[22] Filed: Mar. 30, 1993

[30] Foreign Application Priority Data

Apr. 8, 1992 [DE] Fed. Rep. of Germany ....... 4211817

[51] Int. Cl.$^{5}$ ........................ F15B 13/08; F16K 17/02

[52] U.S. Cl. ........................................ 137/117; 91/451; 137/596.13

[58] Field of Search .............. 91/451; 137/117, 596.13

[56] References Cited

U.S. PATENT DOCUMENTS 5,129,229 7/1992 Nakamura et al. ........ 137/596.13 X

*Primary Examiner*—Gerald A. Michalsky

*Attorney, Agent, or Firm*—Wayne B. Easton

[57] ABSTRACT

A pressure control valve of the type having pump, tank and load-sensing connections used in conjunction with one or more proportional type valves. In this type of system a load-sensing signal is tapped off from the output side of the proportional valves and conveyed to the load-sensing connection of the pressure control valve. A pressure control valve of the type herein has load-sensing and pressure chambers at opposite ends thereof with a slide valve therebetween which is spring biased towards the pressure chamber and controls the internal flow from the pump connection to the tank connection. The slide valve has an auxiliary change-over type valve which selectively connects the pressure chamber to the pump and load-sensing connections in response to a pressure differential between the pump and load-sensing connections to achieve a pressure balance between the load-sensing chamber and the pressure chamber.

11 Claims, 4 Drawing Sheets

Figure 2:
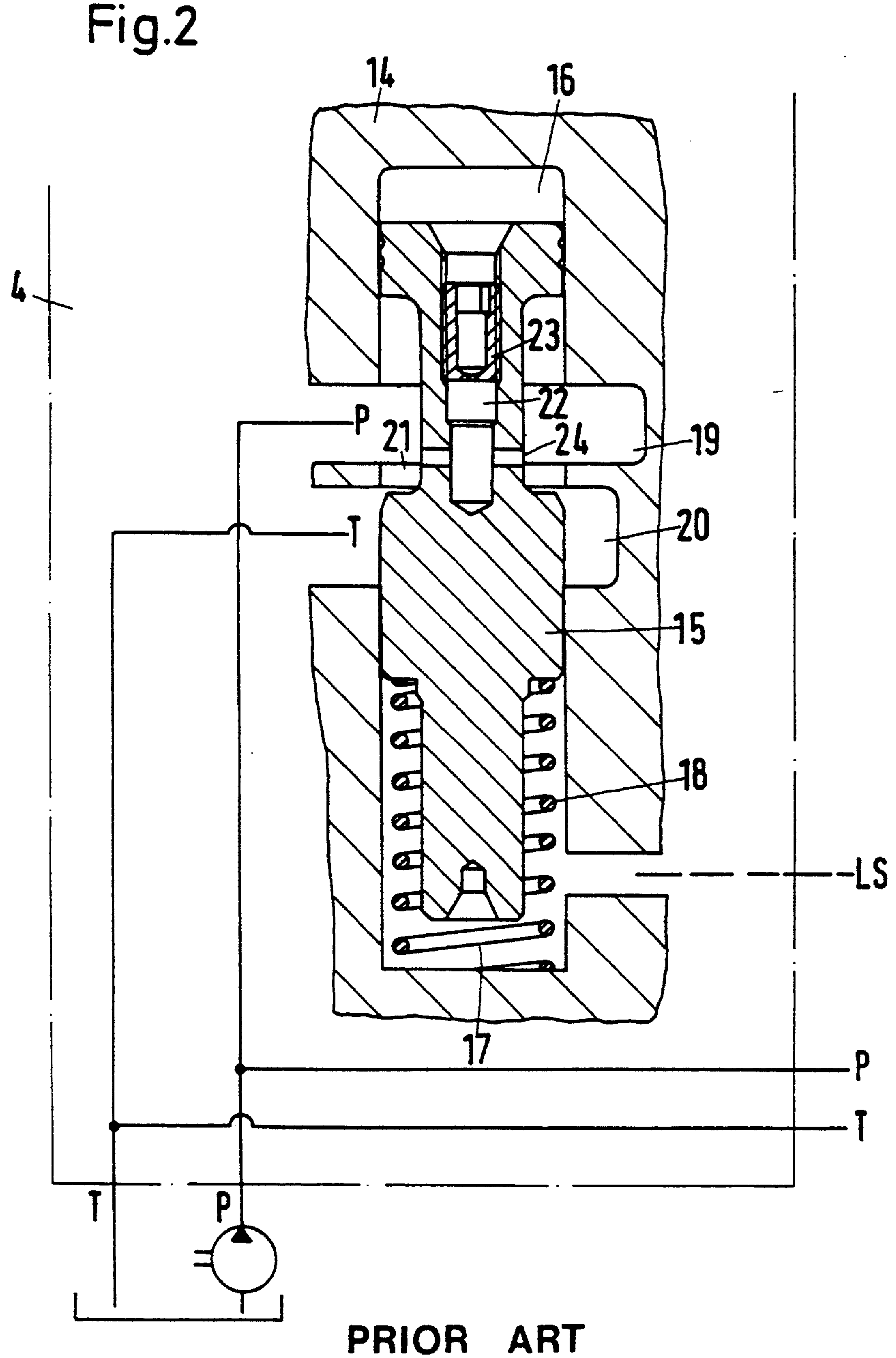

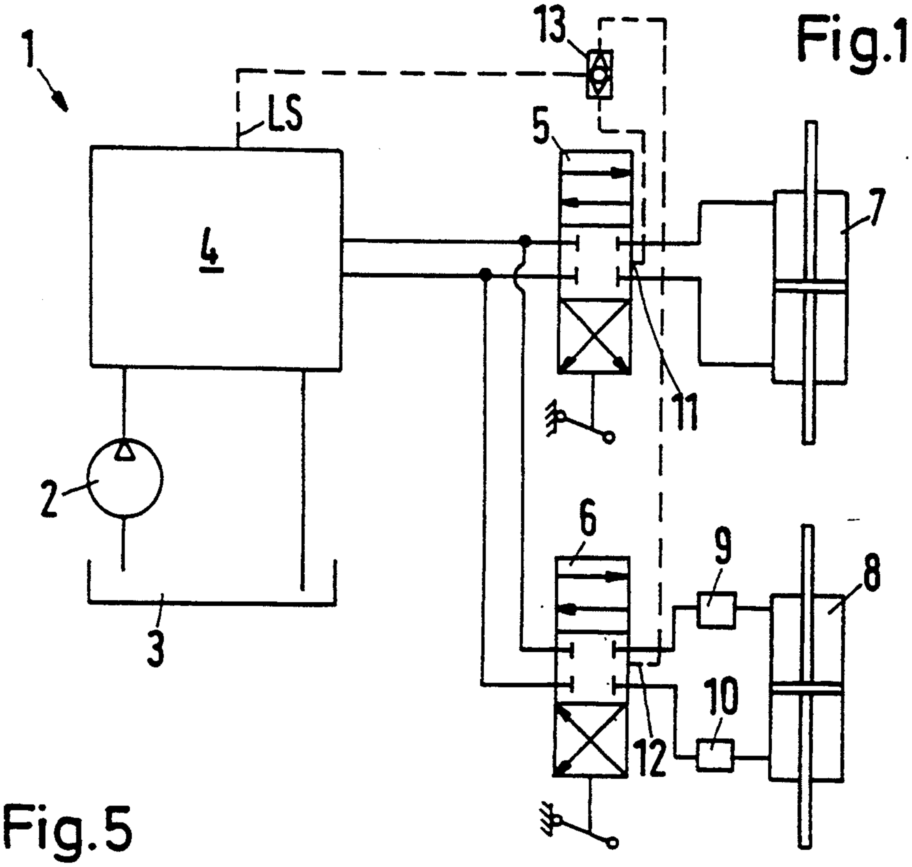
Fig.1
Fig.5
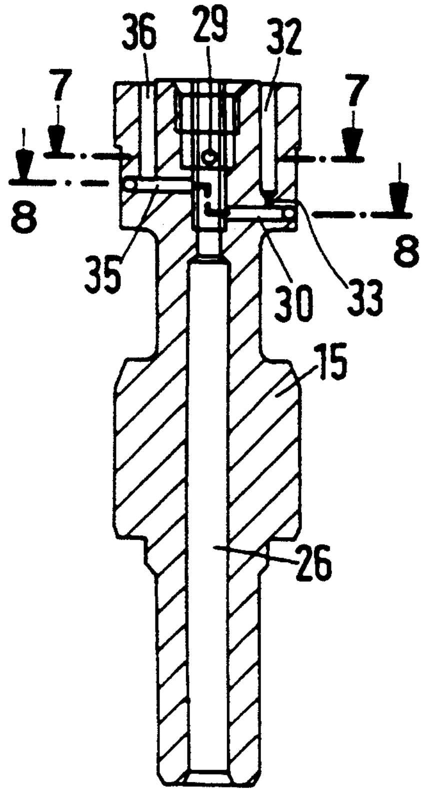
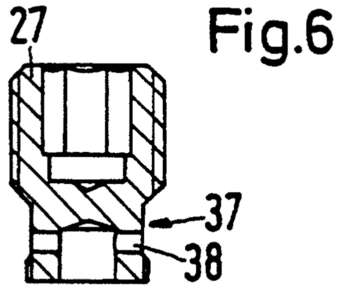
Fig.6
Fig.7
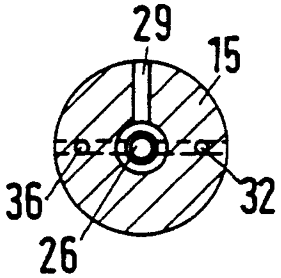
Fig.8
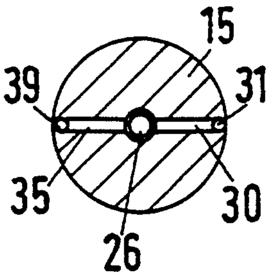

PRIOR ART

PRESSURE CONTROL VALVE

The invention relates to a pressure control valve with a pump connection connected to a pump chamber, a tank connection connected to a tank chamber, a load-sensing connection connected to a load-sensing chamber, a slider member which is mounted in a housing so as to be axially movable and which controls the size of an opening between the pump chamber and the tank chamber, a spring acting on the slider member in the direction of movement, and a pressure chamber which is arranged in the housing on the side of the slider member remote from the spring.

A pressure control valve of that kind is generally arranged in the vicinity of the pump between the pump connection and the tank connection. A pressure control valve of that kind is used together with one or more proportional valves. The pump connection and the tank connection are consequently also connected to the proportional valve or proportional valves. A load-sensing signal is tapped off from the output side of the proportional valves and conveyed to the load-sensing connection of the pressure control valve. Provided that the load-sensing connection is not signalling a requirement for pressure, the slider member opens substantially the opening between the pump chamber and the tank chamber, so that the hydraulic fluid is pumped more or less directly back to the tank again. A pressure control valve of that kind is therefore also known as an "open-centre pump module". As soon as a requirement for pressure for the load-sensing connection is signalled, the slider member is displaced so that it reduces the size of the opening between the pump chamber and the tank chamber, so that the hydraulic fluid is able to pass at a higher pressure to the proportional valve or valves.

The problem with that kind of pressure control valves is that the time taken to build up pressure for the proportional valves has to be exactly matched to the particular proportional valves. If the pressure build-up is effected too quickly, undesirable noises or mechanical impacts can occur. If pressure build-up is too slow, an undesirable delay of the desired function can occur. Both situations are irksome and undesirable for an operator. In some cases narrow limits are also set here for reasons of operational safety.

A further problem when using such a pressure control valve in conjunction with proportional valves is posed by pressure peaks or impacts which are able to occur both on the pump side and on the tank side. If the slider member opens too slowly and at the same a proportional valve closes, pressure peaks can occur on the pump side. Conversely, if the slider member opens too rapidly, pressure peaks can occur on the tank side.

By incorporating throttles in different sections, attempts can then be made to adapt the opening and closing characteristic of the pressure control valve to the given circumstances. This is only possible, however, to a very limited degree. Hydraulic systems, which use proportional valves and the above-mentioned pressure control valve, can therefore be used in different combinations. For example, in some cases load-maintaining valves can be provided between the proportional valves and the work motors which prevent accidental return of hydraulic fluid. This means that the load is constantly maintained. These load-maintaining valves are, for example, not, however, provided for all proportional valves that work together with the pressure control valve. Since in certain situations when using load-maintaining valves no load pressure is able to act on the slider member, a slower pressure build-up occurs with a delayed function of the work motor. If, on the other hand, a proportional valve is used without a load-maintaining valve, the load pressure acts on the slider member which leads to a more rapid reaction. These different reaction times are perceived as being extremely irksome.

Without load-maintaining valves, the following situation can still occur: when a proportional valve is actuated and the slider member in the pressure control valve moves so that the size of the opening between the pump chamber and the tank chamber is reduced, the load-sensing chamber becomes larger. The increased volume of the load-sensing chamber has to be filled with hydraulic fluid. The only possible path into the load-sensing chamber is, however, the load side of the proportional valve, that is to say, the work motor. In the case of a work cylinder, for example, the effect of this is that the cylinder at first drops a little, until the space is filled. This can lead to the operator being put into danger.

The invention is therefore based on the problem of improving the control characteristic of the pressure control valve.

This problem is solved in a pressure control valve of the kind mentioned in the introduction in that the pressure chamber is connected by way of a change-over valve both to the pump connection and to the load-sensing connection, the change-over valve changing over in dependence on the pressures in the two connections.

A pressure balance between the load-sensing chamber and the pressure chamber is achieved in this way. The slider member is influenced exclusively by the force of the spring, regardless of whether the proportional valve is working together with a load-maintaining valve or not. Conversely, on pressure increase, that is, with a movement of the slider in the closing direction of the opening between the pump chamber and the tank chamber, the increase in the volume of the load-sensing chamber is filled directly from the pressure chamber. The hydraulic fluid escaping when the volume reduces can be passed on to the load chamber. A hesitation of the work motor at the start of the movement is thereby avoided. At the same time, the movement characteristic is the same for all types of control, because it depends only on the spring acting on the slider member- Sizing is consequently considerably simplified- In addition, the operator is able to concentrate on the desired sequences of movement of the work motor without having to worry about the configuration with which the particular work motor is controlled, that is, for example, with or without load-maintaining valves.

Preferably, the connection is formed within the slider member. The slider member is connected both to the load-sensing chamber and the pressure chamber, or more accurately speaking, its end faces are exposed to the pressures prevailing therein. When the connection is formed within the slider member, a connection between the pressure chamber and the load-sensing chamber can be guaranteed in every position of the slider member- In addition, with this construction, existing pressure control valves can be adapted. Only the slider member needs to be exchanged. The rest of the valve, in particular the housing, can be left largely unchanged.

A throttle is advantageously provided in the connection between the load-sensing connection and the pressure chamber. The throttle prevents the pressure build-up at maximum load pressure from building up too quickly, that is to say, it limits the speed of movement of the slider member so that only a certain amount of hydraulic fluid per unit of time can be displaced from the pressure chamber. Since the force for closing the opening is determined only by the spring force, the throttle can be made a better match. It can be larger than was previously the case so that the slider member can be moved more quickly, resulting in smaller pressure peaks.

In that case, in an advantageous construction the throttle can be arranged on the pressure chamber side of the change-over valve. The change-over valve is then always exposed to the full pressure of the load-sensing chamber which improves the control characteristic of the change-over valve.

In a first preferred embodiment, the change-over valve has a first connection connected to the pressure chamber, which with the help of a valve member can be connected either to a second connection connected to the load-sensing connection or to a third connection connected to the pump connection. In that case, the paths for the fluid are arranged in the form of a T, the change-over valve being arranged to be switched backwards and forwards between the one or the other branch of the T. The construction is relatively simple.

It is then preferable for the valve member to be in the form of a sphere. A sphere seals the opening to be closed rapidly and reliably.

In another preferred embodiment, the change-over valve has two paths, the first of which forms a connection between the pressure chamber and the loading-sensing connection and the second of which forms a connection between the pressure chamber and the pump connection, the valve member alternately blocking one path and freeing the other. In that case the flow characteristics between the pump connection and the pressure chamber on the one hand and the pressure chamber and the load-sensing connection on the other hand can be designed to be different. The change-over valve frees only one of the two paths at a time.

It is then preferable for the valve member to be in the form of a slider member. Such a slider member is sufficiently long to be able to meet the task.

It is also preferred for the ends of the slider member, which are in particular spherically rounded, to form pressure faces on which the pressures in the pump connection and in the load-sensing connection act. The spherically rounded ends give rise to a satisfactory seal in the path to be closed. On the other hand, they are also available as pressure faces and therefore as control faces for the change-over valve.

Advantageously the second path has a lower flow resistance than the first path. The pressure build-up is consequently effected more slowly than the reduction in pressure. This is generally experienced by the operator as a very pleasant feel.

It is also preferable for the second path, at least between the change-over valve and the pressure chamber, not to have a throttle- Since the throttle is arranged in the first path, the desired flow behaviour is therefore ensured.

Figure 3:
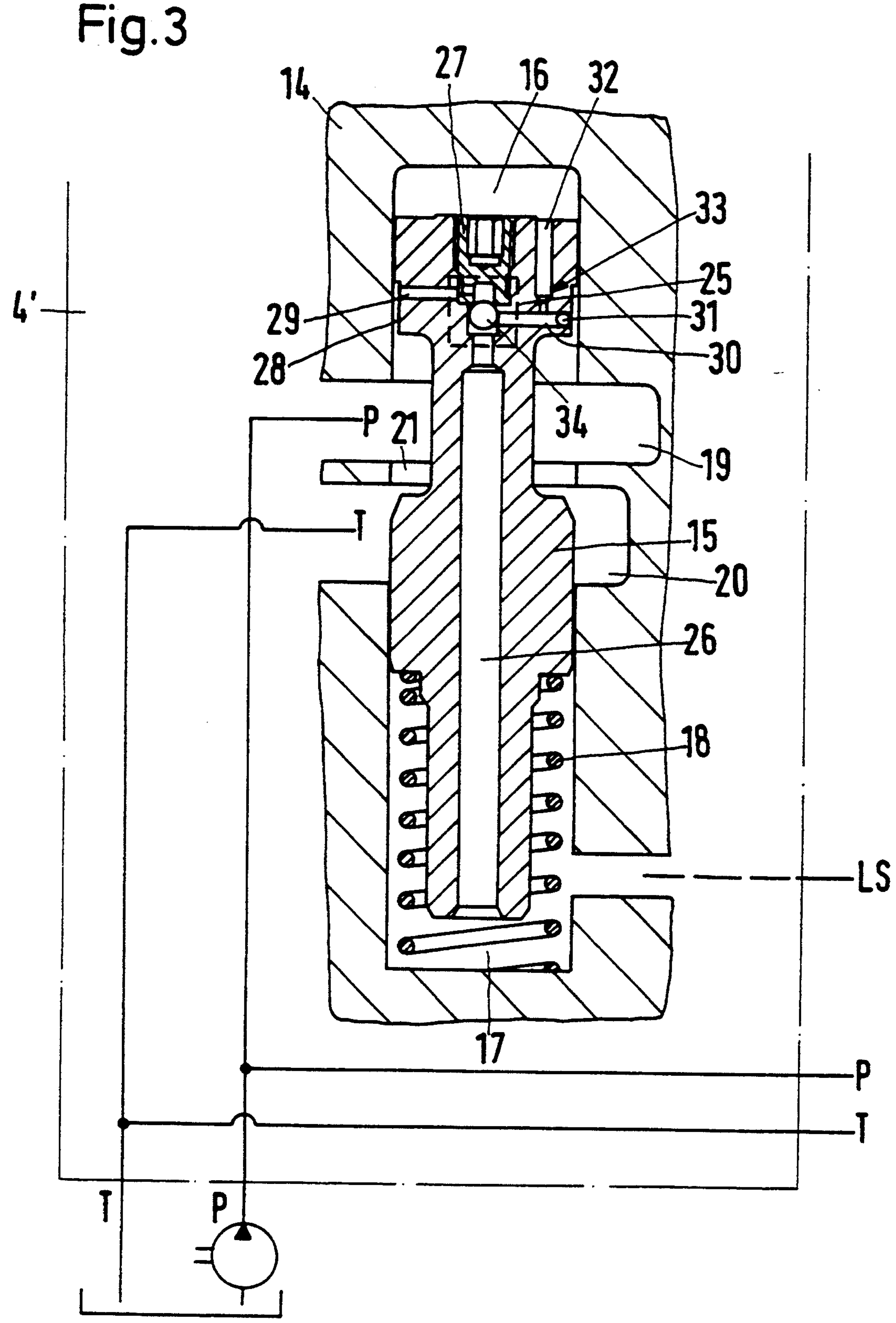
Figure 4:
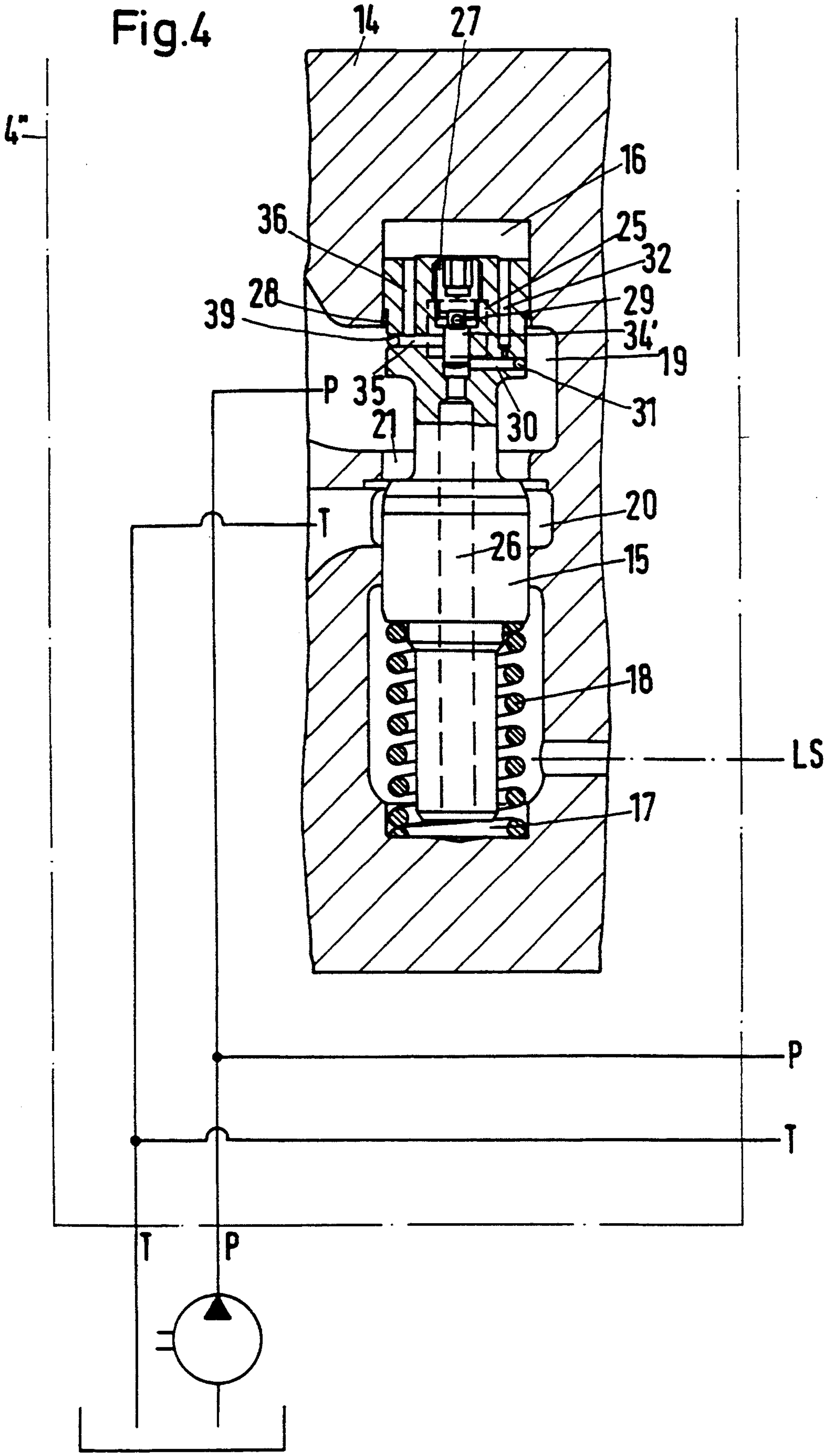

The invention is explained in detail hereinafter with reference to preferred embodiments and in conjunction with the drawings, in which FIG. 1 is a diagrammatic representation of a control valve in a hydraulic system, FIG. 2 shows a state-of-the-art control valve, FIG. 3 shows a first embodiment of a control valve, FIG. 4 shows a second embodiment of a control valve, FIG. 5 shows a larger-scale illustration of a slider member of the control valve, FIG. 6 shows a slider member insert, FIG. 7 shows a section according to FIG. 5 and FIG. 8 shows a section according to FIG. 5.

FIG. 1 shows a hydraulic system 1 with a pump 2, which draws hydraulic fluid from a tank 3 and feeds it to a pressure control valve 4. From the pressure control valve 4 the hydraulic fluid flows back to the tank 3 again. The pressure control valve 4 is connected to a first proportional valve 5 and to a second proportional valve 6, the first proportional valve 5 being connected directly with a first work motor 7 while the second proportional valve 6 is connected by way of two load-maintaining valves 9, 10 to a second work motor 8. Depending on the position of the proportional valves 5, 6, hydraulic fluid is fed to one or other work chamber of the work motors 7, 8, while the hydraulic fluid displaced from the other work champher flows back through the respective proportional valve 5, 6 and the pressure control valve 4 to the tank 3.

The proportional valves 5, 6 each have a respective load-sensing output 11, 12. Both load-sensing outputs 11, 12 are connected to the inputs of a load-sensing change-over valve 13. The output of the load-sensing change-over valve 13 is connected to a load-sensing connection LS of the pressure control valve 4. It is also possible, of course, for further proportional valves to be connected to the load-sensing output LS of the pressure control valves 4 by way of further change-over valves, not illustrated. The highest working pressure of all proportional valves is always in this manner passed to the load-sensing connection LS of the pressure control valve.

In order to explain clearly the problems of a state-of-the-art pressure control valve, FIG. 2 illustrates a conventional pressure control valve 4.

A slider member 15 is arranged to be axially movable in a housing 14. At one end face of the slider member 15 there is a pressure chamber 16. At the other end face of the slider member there is arranged a load-sensing chamber 17 which is in communication with the load-sensing connection LS. In the load-sensing chamber 17 there is a spring 18 which acts in the same direction on the slider member 15 as the pressure in the load-sensing chamber 17.

The pump connection P of the pressure control valve 4 is connected to a pump chamber 19, the tank connection T is connected to a tank chamber 20. Between the pump chamber 19 and the tank chamber 20 there is provided in the housing an opening 21, which is opened or closed to a greater or lesser degree on axial movement of the slider member 15.

The slider member 15 has an axial blind bore 22, into which a throttling element 23, that is, an aperture, is screwed. The blind bore is connected by way of radial ducts 24 to the pump chamber 19.

The pressure control valve operates as follows:

The pump pressure, that is to say, the pressure at the pump connection P, which also prevails in the pump chamber 19, is transferred by way of the radial ducts 24, the blind bore 22 and the throttling element 23 into the pressure chamber 16. The slider member 15 is consequently displaced against the force of the spring and the pressure in the load-sensing chamber 17 until a state of equilibrium, which is dependent on the load, is reached. With a system without load-maintaining valves, that is to say, for example, a system that merely has one proportional valve 5 with a directly connected work motor 7, on operation of the proportional valve a load pressure is transmitted by way of the load-sensing connection LS to the load-sensing chamber 17. The force that displaces the slider member upwards in the drawing, that is to say, in the direction in which the size of the opening 21 reduces, is made up of the force of the spring 18 and the force generated by the pressure in the load-sensing chamber 17. In other words, the closing force is dependent on the load pressure. Since the load pressure varies with the loading, which in turn is dependent on what function is being carried out, the closing characteristic of the slider member 15 is different from case to case.

On sudden increase in the load-sensing pressure in the load-sensing chamber 17, the throttling element 23 prevents too rapid a movement of the slider member 15 in the direction in which the opening 21 reduces. The throttling element 23 limits the speed at which the hydraulic fluid is able to flow out of the pressure chamber 16.

Whenever a pressure build-up is to be achieved, that is to say, the slider member 15 is moved in a direction in which the size of the opening 21 reduces, the load-sensing cham3Der 17 enlarges. It therefore has to be filled with hydraulic fluid which can only be drawn from the working side. Although in this case only small quantities are involved, for instance 2 to 3 $cm^3$, the operator sometimes finds this irksome because the work motor briefly moves first in the wrong direction until the load-sensing chamber 17 is filledFor example, a lifting cylinder drops at the start of a lifting movement by a few millimetres.

In order to avoid these undesirable phenomena, in an embodiment of the invention illustrated in FIG. 3 the pressure chamber 16 is connected by way of a change-over valve 25 either to the pump connection P or to the load-sensing connection LS, the change-over valve 25 changing over in dependence on the pressures in the two connections P, LS.

Parts which correspond to those of FIG. 2 are provided with the same reference numbers.

The slider member 15 has a through-bore 26. An insert 27, which closes the through-bore 26, is screwed into the through-bore 26 at the upper end thereof, that is to say, at the end facing the pressure chamber 16.

Where the terms top and bottom are used in the following description, they refer to the drawing. They do not, however, provide any evidence of the actual spatial position of the slider member or of the pressure control valve.

Above the pump chamber 19 the slider member 15 is narrowed and thus forms with the housing 14 a circumferential groove 28 connected to the pump chamber 19. A radial duct 29 connected to the through-bore 26 opens into the circumferential groove. Below the opening of the radial duct 29 into the through-bore 26 there is provided a further radial duct 30 which is closed with a plug 31. An eccentrically arranged further axial duct 32, which has a throttling point 33 at its lower end, opens into this radial duct 30. The axial duct 32 is connected to the pressure chamber 16.

The change-over valve 25 is arranged so that its valve member 34, here in the form of a sphere, either produces a connection between the two radial ducts 29, 30 or, by way of the longer part of the through-bore 26, produces a connection between the load-sensing chamber 17 and the radial duct 30. For that purpose the first radial duct 29 opens into the through-bore somewhat above the second radial duct 30, so that the sphere 34 can always be acted upon by pressures in the axial direction.

By way of the circumferential groove 28, the radial duct 29, the change-over valve 25, the radial duct 30, the throttling point 33 and the axial duct 32 the pressure of the pump connection P, which also prevails in the pump chamber 19, is able to pass into the pressure chamber 16. Here, the valve member 34 is pressed downwards, therefore closing the longer part of the through-bore 26 and thus preventing hydraulic fluid penetrating into the load-sensing chamber 17. On control operation of the proportional valves, the load pressure is transferred to the load pressure connection LS and consequently to the load pressure chamber 17. The change-over valve 25 is consequently changed over, that is to say, the valve member 34 opens the connection between the load pressure chamber 17 and the pressure chamber 16. Since the pressures on both sides of the slider member 15 are now equal, the movement of the slider member is influenced exclusively by the spring 18. Movement of the slider member where the slider member end faces are of predetermined equal area and closing of the opening 21 are therefore independent of the prevailing load.

When the slider member 15 is moved in the direction in which the size of the opening 21 reduces, hydraulic fluid is able to be displaced from the pressure chamber 16 by way of the axial duct 32, the throttling point 33, the radial duct 30, the change-over valve 25 and the through-bore 26 into the load-sensing chamber 17. It is therefore not necessary to convey hydraulic fluid by way of the load-sensing connection LS from the load side. Movements of the work motors remain unaffected thereby. The volume of hydraulic fluid displaced from the pressure chamber 16 is exactly the same as the volume that has to be introduced into the load-sensing chamber 17.

Because the closing characteristic of the slider member 15 is influenced exclusively by the spring 18, the throttling point 33 can be dimensioned taking into account exclusively this given starting point. It can be made larger, that is, with less throttling resistance, than was previously the case. A more rapid opening movement of the slider member is consequently possible, which results in smaller pressure peaks.

The throttling point 33 is arranged on the pressure chamber side of the change-over valve. The pressure from the load-sensing chamber 17 is therefore able to pass uninfluenced to the change-over valve 25.

FIG. 4 shows another embodiment in which parts that correspond to those of FIG. 3 are provided with the same reference numbers.

Unlike FIG. 3, where the connections between the pressure chamber 16, the load-sensing connection LS and the pump connection P were arranged in the manner of a T, in the embodiment shown in FIG. 4 two different paths between the pressure chamber 16 and the pump connection P on the one hand and the pressure chamber 16 and the load-sensing connection LS on the other hand are provided. The connection between the pressure chamber 16 and the load-sensing connection LS is, as in FIG. 3 also, formed by way of the through-bore 26, which is connected to the load-sensing chamber 17, the change-over valve 25, the second radial duct 30, the throttling point 33 and the axial duct 32.

The connection between the pressure chamber 16 and the pump connection P is designed as follows: the first radial duct 29 running at right angles to the plane of the drawing in FIG. 4 opens into the circumferential groove 28 of the pump chamber 19. Hydraulic fluid passes from here by way of a circumferential groove 37 formed by a constriction in the diameter of the insert 27 and radial ducts 38 also formed in the insert 27 into the through-bore 26, namely on the side of the change-over valve 25 remote from the load-sensing chamber 17. The change-over valve 25 here has a valve member 34' which is in the form of a slider member with spherically rounded ends. This slider member closes either the second radial duct 30 or, as illustrated in FIG. 4, closes a third radial duct 35, which is also sealed by a plug 39 and into which a further axial duct 36 which is connected to the pressure chamber 16 opens. The valve member 34' of the change-over valve 25 thus either opens the path between the pressure chamber 16 and the load-sensing chamber 17 and simultaneously blocks the path between the pressure chamber 16 and the pump chamber 19, or opens the path between the pressure chamber 16 and the pump chamber 19 and simultaneously blocks the path between pressure chamber 16 and load-sensing chamber 17.

The function is in principle the same as in FIG. 3. It is only the opening characteristic of the slider member 15 that has changed. Because the second path between the pressure chamber 16 and the pump connection P has a lower flow resistance, and indeed in the present case has no throttling point at all, hydraulic fluid is able to pass more quickly from the pump chamber 19 into the pressure chamber 16 when the opening 21 is to be enlarged, in order to reduce the pressure at the proportional valves.

The embodiments illustrated can be modified in many respects. Thus, instead of the pump, in general, a pressure source can be used and, instead of the tank, in general a pressure sink can be used. The connection between proportional valve and pump and tank need not be taken by way of the pressure control valve. It is sufficient for the pressure control valve to be arranged between the pump connection P and the tank connection T.

Although for manufacturing reasons this is preferable, it is not necessary for the connection between the pressure chamber 16 and the load-sensing chamber 17 to be arranged inside the slider member. It can in principle also be arranged in the housing 14.

We claim:

1. A pressure control valve, comprising, a housing defining central bore means, a slide valve slidably disposed in said bore means and defining with said housing a pressure chamber at one end thereof and a load sensing chamber at the other end thereof, said housing having an extrnal load sensing connection for said load sensing chamber, said housing having pump and tank chambers defined by said slide valve and respective associated external pump and tank connections, spring means biasing said slide valve in the direction of said pressure chamber, said slide valve being moveable in the direction of said pressure chamber to control a flow path between said pump and tank chambers with the movement of said slide valve in the direction of said pressure chamber being effective to further restrict flow between said pump and tank chambers, fluid passage means in said slide vavle providing fluid communication (1) between said pressure chamber and said pump chamber and (2) between said presure chamber and said load sensing chamber, and change-over valve means in said fluid passage means effective to provide fluid communication between said pressure and load sensing chambers when the pressure in said load sensing chamber is higher than the pressure in said pressure chamber.

2. A pressure control valve according to claim 1 wherein said change-over valve means is effective to provide fluid communication between said pump and pressure chambers only when the pressure in said load sensing chamber is lower than the pressure in said pressure chamber.

3. A pressure control valve according to claim 1 wherein said change-over valve means is formed within said slide valve.

4. A pressure control valve according to claim 1 wherein a throttle is provided in said fluid passage means between said load-sensing chamber and said pressure chamber.

5. A pressure control valve according to claim 4 wherein said throttle is between said pressure chamber and said change-over valve means.

6. A pressure control valve according to claim 1 wherein said change-over valve means includes a ball shaped valve member.

7. A pressure control valve acording to claim 1 wherein said change-over valve means forms first and second paths, said first path being a connection between said pressure chamber and said loading-sensing connection, said second path being a connection between said pressure chamber and said pump connection, said change-over valve means having a valve member which alternately blocks one path and frees the other.

8. A pressure control valve according to claim 7 where said valve member is in the form of a slider member.

9. A pressure control valve according to claim 8 wherein the ends of said slider member are spherically rounded and form pressure faces upon which the pressures at said pump connection and at said load-sensing connection act.

10. A pressure control valve according to claim 7 wherein said second path has a lower flow resistance than said first path.

11. A pressure control valve according to claim 7 wherein at least between said change-over valve means and said pressure chamber said second path does not have a throttle.

* * * * *